P. MUELLER.
METHOD OF APPLYING COUPLING NUTS TO SHOULDERED NIPPLES.
APPLICATION FILED MAR. 28, 1911.
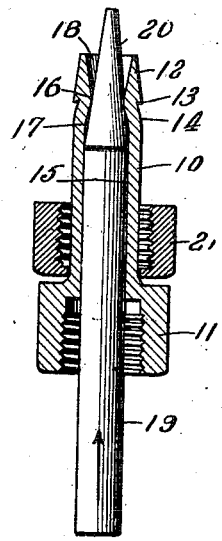
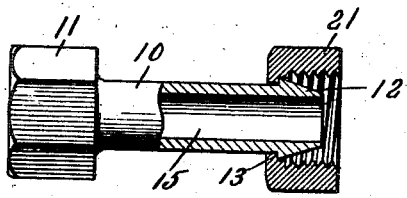

UNITED STATES PATENT OFFICE.

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

METHOD OF APPLYING COUPLING-NUTS TO SHOULDERED NIPPLES.

998,587. Specification of Letters Patent. Patented July 18, 1911.

Application filed March 28, 1911. Serial No. 617,518.

*To all whom it may concern:*

Be it known that I, PHILIP MUELLER, a citizen of the United States, residing at Decatur, in the county of Macon and State of Illinois, have invented new and useful Improvements in Methods of Applying Coupling-Nuts to Shouldered Nipples, of which the following is a specification.

This invention relates to a method of applying coupling nuts to shouldered nipples and other tubular members by means of pressure applied within the nipple after the nut has been placed thereon.

The object of the invention is to form in a simple, cheap, and accurate manner, without the use of skilled labor, nipples and other fittings provided with a union coupling nut by employing a suitable stock the stem of which is of uniform diameter throughout its length with an external groove near one end to form a shoulder. The bore of the stem is also straight for the greater part of its length but contracted opposite the external groove so that when pressure is applied from within, the upper edge of the external groove will be forced laterally and project beyond the periphery of the stem in the form of a shoulder which will retain the coupling nut on the stem and form a bearing or abutment when the nut is screwed on a coacting part.

Other objects of invention not hereinabove mentioned will be described hereinafter, pointed out in the claims, and illustrated in the accompanying drawings, in which—

Figure 1 is a longitudinal sectional view of a nipple with a coupling nut thereon and an expanding tool in the bore, and Fig. 2 is a view partly in elevation and partly in section of the completed article.

In the drawing, 10 indicates a tubular cylindrical member which may be of any desired character, but here shown for convenience of illustration, as the stem of a nipple on one end of which is a threaded enlargement 11. The opposite end of the stem 10 may be tapered as at 12, at the base of which tapered portion or a short distance from its end, the stem is undercut to form a shoulder 13 from the bottom of which is a second tapered portion 14 extending rearwardly any desired distance. The shoulder 13 and tapered portion 14 forming together an external groove. The stem 10 may be, and preferably is, made of uniform diameter throughout its length, and the shoulder 13 and tapered portions 12 and 14 formed on a lathe or other tool, or the exterior groove may be otherwise produced. The bore 15 of the stem is cylindrical for the greater part of its length, but begins to lessen in diameter from about the beginning of the tapered portion 14 to the shoulder 13 at which point 16 the bore is most contracted. The bore then gradually widens in the type of fitting shown to the end of the stem. It will be noted upon inspection of Fig. 1, that the tapered portion 17 of the bore behind the contracted part 16 thereof is substantially parallel with the exterior taper 14, while the forward tapered part 18 when made in the bore is widest at the extremity of the stem and there has a diameter equal to the bore 15. The contracted or reduced part 16 of the bore may be formed in any desired way, as for instance, by casting the stem with an annular projection 16 extending into the bore or by forming the stem with a small bore having a diameter equal to that of the contracted portion and then drilling out and tapering the same by suitable and well known tools. With a nipple or other fitting having an end formed as above described the next step in the operation is to expand said end in a lateral direction to cause the shoulder 13 to project beyond the body of the stem 10, as in Fig. 2. To do this, a cylindrical expanding tool 19 having a long tapered end 20 is inserted in the bore 15 from the rear and pressed forward, first slipping the coupling nut 21 over the stem 10. The tapered end of the expander 20 coming in contact with the contracted part 16 and tapered wall 17 of the bore, presses the material forming the stem 10 laterally and forces the shoulder 13 outwardly and causes it to project beyond the periphery of said stem, at the same time straightening the angular or tapering part 14 in line with the rest of the stem.

By this method of construction, union couplings can be made on the ends of fittings having an enlargement in rear of the shoulder or retaining collar 13 over which the coupling nut cannot pass, by very simple means and at a greatly reduced cost. Furthermore, the shoulder, being integral with the rest of the fitting, will be very strong.

What I claim is:—

1. The herein described method of securing coupling nuts on tubular fittings, which consists in forming a shoulder on the exterior of the tubular fitting by grooving the same, reducing the bore of said fitting opposite said shoulder, slipping a nut over said tubular fitting and then forcing an expander through said bore to press the material laterally, whereby said shoulder is carried beyond the periphery of said tubular fitting to form a retaining collar for the coupling.

2. The herein described method of securing coupling nuts on tubular fittings, which consists in forcing laterally the walls of said tubular fitting after slipping a nut thereover, by means of an expanding tool acting in the bore thereof against a reduced part of said bore opposite a shoulder formed by grooving the exterior of the tubular fitting, said shoulder being forced beyond the peripheral surface of said fitting.

3. The herein described method of securing coupling nuts on tubular fittings, which consists in forcing an expanding tool through the bore of said tubular fitting after slipping a coupling nut thereon, to force an inwardly inclined portion of the walls of said fitting laterally in a continuous straight line and project an exterior shoulder formed on said fitting and of less diameter than the opening through the coupling nut flange outwardly to form a retaining collar for said coupling nut.

4. The herein described method of securing coupling nuts on tubular fittings, which consists in pressing the walls of a tubular fitting, over which a coupling nut has been slipped, laterally to force an exterior shoulder formed on said fitting outwardly to produce a retaining collar for said coupling nut.

5. The herein described method of securing coupling nuts on tubular fittings, which consists in pressing the walls of a tubular fitting, over which a coupling nut has been slipped, laterally by interior pressure exerted in a longitudinal direction to force an exterior shoulder formed on said fitting outwardly to produce a retaining collar for said coupling nut.

6. The herein described method of securing coupling nuts on tubular fittings, which consists in tapering the end of a fitting, forming a shoulder therein at the base of the taper and reducing the diameter of the bore in line with said shoulder, then forcing an expander through the bore, after placing a coupling nut on the tubular fitting, to spread said shoulder laterally and project it beyond the periphery of said fitting and the flange of the nut.

7. The herein described method of securing coupling nuts on tubular fittings, which consists in forming a shoulder near the end of a fitting and tapering said fitting from the bottom of said shoulder toward the rear of the fitting for a suitable distance, reducing the bore of said fitting in line with said shoulder and tapering it therefrom parallel to the external taper, and then forcing an expander through said bore, after placing a coupling nut on the tubular member, to spread laterally said tapered portion into line with the main part of said fitting and cause the shoulder to project beyond it.

In testimony whereof I have hereunto set my hand in presence of two subscribing witnesses.

PHILIP MUELLER.

Witnesses:
LEONARD F. MCKIBBEN,
WILLIAM R. BIDDLE.